(No Model.)

H. SMITH.
TOP PROP NUT.

No. 272,594. Patented Feb. 20, 1883.

Witnesses
Hiram A. Gray
Daniel S. Glenney Jr

Inventor
Henry Smith
by Geo. Terry
Atty.

N. PETERS, Photo-Lithographer, Washington, D. C.

UNITED STATES PATENT OFFICE.

HENRY SMITH, OF NEW HAVEN, CONNECTICUT.

TOP-PROP NUT.

SPECIFICATION forming part of Letters Patent No. 272,594, dated February 20, 1883.

Application filed August 18, 1882. (No model.)

*To all whom it may concern:*

Figure 1:
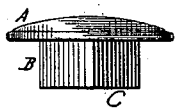
Figure 2:
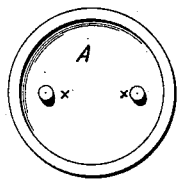
Figure 3:
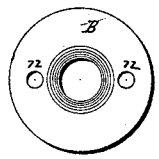
Figure 4:
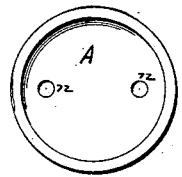
Figure 5:
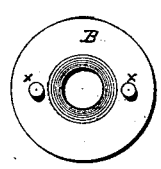
Figure 6:
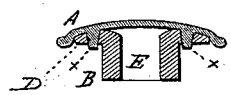

Be it known that I, HENRY SMITH, a citizen of the United States of America, residing at New Haven, in the county of New Haven and State of Connecticut, have invented certain new and useful Improvements in Top-Prop Nuts, of which the following is a specification, reference being had therein to the accompanying drawings, in which—
Figure 1 is a view of the nut. Fig. 2 is a view of the inside of the front part and of the pins for holding the parts of the nut together. Fig. 3 is a view of the circular flange on the nut and of the holes through the same. Fig. 4 is a view of the front part of the nut. Fig. 5 is a view of the circular flange on the nut and of the pins for holding the parts of the nut together, and Fig. 6 is a vertical section of the nut.
My invention is an improvement in the top-prop nut patented to me September 9, 1879, No. 219,417; and it consists in making the nut in two cast-metal parts, fastened together by pins on one of the parts, which pass through holes in the other part, and are headed, as described more fully hereinafter, and claimed.

A, Figs. 2 and 4, is the circular front part of the nut. Its outside is convex, and any desired ornamental figure or figures may be made on the same. The pins $x$ are formed on its inside, which pass through the holes $n$ in the part B, and are riveted or have heads formed on them to fasten the two parts of the nut together, as shown in Fig. 2. The pins may be formed on the part B and the holes be made in the part A, as shown in Figs. 4 and 5. The part B has the square part C, by which the nut is turned, and the circular flange D. The central hole, E, Fig. 6, is threaded before the parts of the nut are fastened together, and the tap can pass through the hole, making it of uniform size. The pins are riveted or have heads formed on them in a drop, in which the parts A and B of the nut are placed. The nuts are finished by plating the front part, or in any other desired way.

I am well aware that top-prop nuts have been made in two parts, with a nut having a circular flange, over the edge of which circular pieces of sheet metal have been turned to hold the sheet-metal pieces to the nut; and, also, with two cast-metal parts—a nut proper, having a circular shank with beveled edge, and a front part having a circular rim concentric with the front part, the rim forming a recess in which the shank of the nut proper is placed, and the rim being set over the beveled edge of the shank to hold the two parts together; and I make no claim to these nuts; but

I claim as my invention, and desire to secure by Letters Patent, the improvement on the nut patented to me, as before mentioned, which is embraced in the following claim:

The top-prop nut herein described, consisting of the two cast-metal parts, A and B, fastened together by pins formed on one of the parts, which pass through holes in the other part and are headed to hold the two parts of the nut together, as shown and set forth.

In testimony whereof I affix my signature in presence of two witnesses.

HENRY SMITH.

Witnesses:
GEORGE TERRY,
HIRAM A. GRAY.